United States Patent [19]

Tsai

[11] Patent Number: 5,240,105
[45] Date of Patent: Aug. 31, 1993

[54] MULTI-PURPOSE EYEGLASSES POUCH

[76] Inventor: Allan Tsai, No. 133, Yen-Shou St., Taipei, Taiwan

[21] Appl. No.: 947,573

[22] Filed: Sep. 21, 1992

[51] Int. Cl.$^5$ .............................................. A45C 11/04
[52] U.S. Cl. ......................................... 206/5; 383/4; 383/68; 383/72; 383/92
[58] Field of Search ...................... 206/5, 38; 383/4, 5, 383/68, 72, 92

[56] References Cited

U.S. PATENT DOCUMENTS

| 204,615 | 6/1878 | Sanford | 383/5 |
| 722,801 | 3/1903 | Bourne | 383/4 |
| 3,160,343 | 12/1964 | Schantzer | 383/4 |
| 4,175,604 | 11/1979 | Bonner | 383/5 |
| 4,983,047 | 1/1991 | Netto | 383/92 |
| 5,151,778 | 9/1992 | Conley | 206/5 |

Primary Examiner—David T. Fidei
Attorney, Agent, or Firm—Cushman, Darby & Cushman

[57] ABSTRACT

A multi-purpose eyeglasses pouch includes a pouch body formed from a rectangular piece of cloth and having three sides provided with a row of evenly distributed holes. The pouch body is folded so as to align the holes in two opposite sides of the pouch body and so as to cause the holes in the remaining side to overlap. A fastening unit includes a pair of first flexible strips and a pair of second flexible strips. One of the first flexible strips is formed with a row of holes which are aligned with the holes formed in the two opposite sides, while the other one of the first flexible strips is formed with a row of projections which extend into the holes in the two opposite sides and which engage releasably the holes in the other first flexible strip so as to join the two opposite sides of the pouch body. One of the second flexible strips is formed with a row of holes which are aligned with the overlapping holes in the remaining side, while the other one of the second flexible strips is formed with a row of projections which extend into the overlapping holes and which engage releasably the holes in the other second flexible strip so as to join folded halves of the remaining side of the pouch body.

2 Claims, 3 Drawing Sheets

MULTI-PURPOSE EYEGLASSES POUCH

BACKGROUND OF THE INVENTION

1. Field of the Invention

The invention relates to an eyeglasses pouch, more particularly to a multi-purpose eyeglasses pouch which can be used for wiping the lenses of a pair of eyeglasses, for storing the eyeglasses therein and as a strap for retaining the eyeglasses on the head of the user.

2. Description of the Related Art

Presently, eyeglasses are stored in and are protected by a hard-shell case or by a flexible pouch. A piece of cloth is provided inside the case or pouch and is used to wipe the lenses of the eyeglasses. An optional strap is sometimes provided to retain the eyeglasses on the head of the user when said eyeglasses is in use.

A main drawback of conventional cases or pouches is that they are relatively big and inconvenient to carry. Furthermore, conventional cases and pouches only serve to protect and store eyeglasses therein.

SUMMARY OF THE INVENTION

Therefore, the objective of the present invention is to provide a multi-purpose eyeglasses pouch which is relatively small and lightweight, thus making it convenient to carry.

Another objective of the present invention is to provide a multi-purpose eyeglasses pouch which can be used for wiping the lenses of a pair of eyeglasses, for storing the eyeglasses therein and as a strap for retaining the eyeglasses on the head of the user.

Accordingly, the multi-purpose eyeglasses pouch of the present invention comprises:

a pouch body formed from a rectangular piece of cloth and having a first side, a second side, a third side opposite to the first side and a fourth side opposite to the second side, each of the first, second and third sides being provided with a row of evenly distributed holes, said pouch body being folded so as to align the holes in the first side with the holes in the third side and so as to cause the holes in the second side to overlap; and a fastening unit including a pair of first flexible strips and a pair of second flexible strips, one of the first flexible strips being formed with a row of holes which are aligned with the holes formed in the first and third sides, the other one of the first flexible strips being formed with a row of projections which extend into the holes in the first and third sides and which engage releasably the holes in said one of the first flexible strips so as to join the first and third sides, one of the second flexible strips being formed with a row of holes which are aligned with the overlapping holes in the second side, the other one of the second flexible strips being formed with a row of projections which extend into the overlapping holes and which engage releasably the holes in said one of the second flexible strips so as to join folded halves of the second side.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
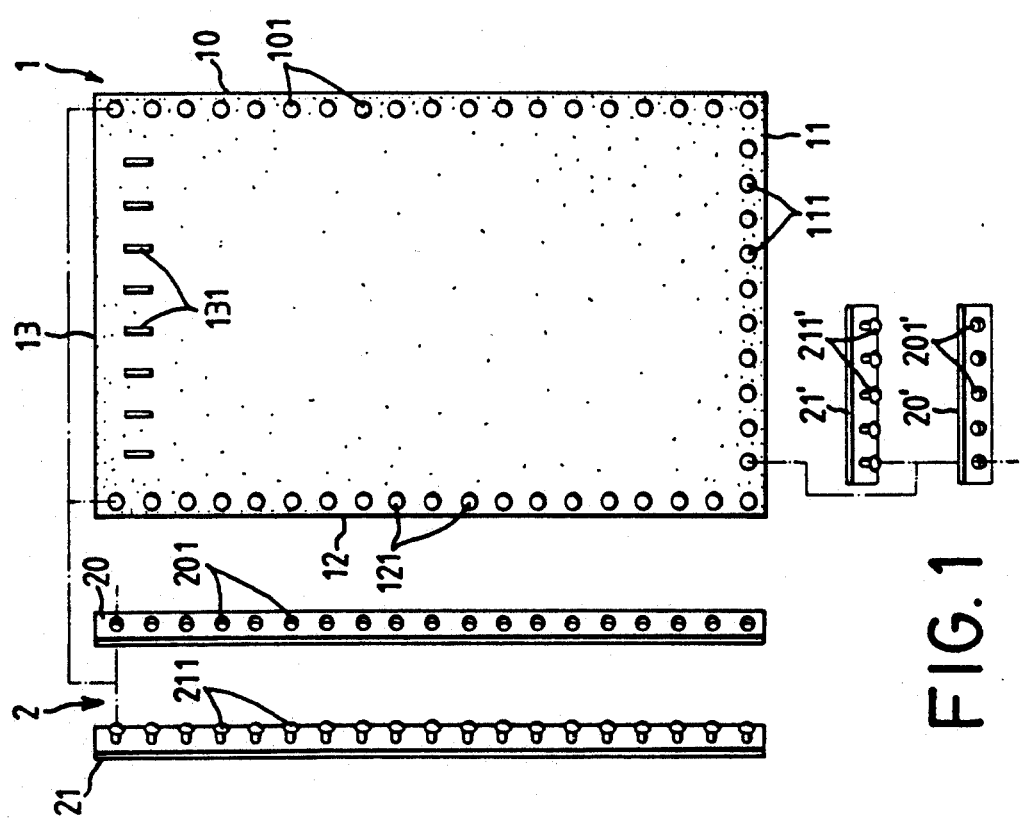
FIG. 1 is an exploded view of the first preferred embodiment of a multi-purpose eyeglasses pouch according to the present invention.

Referring to FIG. 1, the first preferred embodiment of a multi-purpose eyeglasses pouch according to the present invention is shown to comprise a pouch body (1) and a fastening unit (2).

The pouch body (1) is formed from a piece of cloth which can be used to wipe the lenses of a pair of eyeglasses. The pouch body (I) is rectangular in shape and has first, second, third and fourth sides (10, 11, 12, 13). Each of the first, second and third sides (10, 11, 12) is provided with a row of evenly distributed holes (101, 111, 121) which are disposed adjacent to a peripheral edge of the same. When the pouch body (1) is folded into two, as shown in FIG. 2, the holes (101) in the first side (10) are aligned with the holes (121) in the third side (12), while the holes (111) in the second side (11) overlap.

The fastening unit (2) includes a pair of first flexible strips (20, 21) and a pair of second flexible strips (20', 21'). The flexible strips (20, 20') are provided with a row of evenly distributed holes (201, 201'). The flexible strips (21, 21') are formed with a row of evenly distributed projections (211, 211') which engage releasably the holes (201, 201') in a respective one of the flexible strips (20, 20').

The pouch body (1) can be used to wipe the lenses of a pair of eyeglasses when the pouch body (i) is in an unfolded state. The pouch body (1) is folded, and the fastening unit (2) is used to close two sides of the folded pouch body (1) so as to permit storage of the eyeglasses therein.

Figure 2:
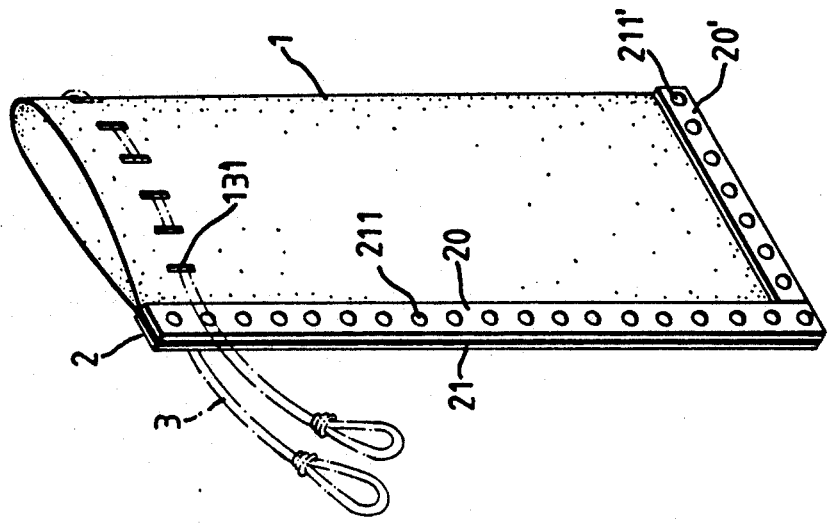
FIG. 2 is a perspective view of the first preferred embodiment.

Referring to FIG. 2, the holes (201) of the flexible strip (20) are aligned with the holes (101, 121) formed in the first and third sides (10, 12) when the pouch body (1) is folded into two. The projections (211) of the flexible strip (21) extend into the holes (101, 121) and engage releasably the holes (201) in the flexible strip (20), thereby joining the first and third sides (10, 12) of the pouch body (1). The holes (201') of the flexible strip (20') are aligned with the overlapping holes (111) formed in the second side (11) of the pouch body (1). The projections (211') of the flexible strip (21') extend into the overlapping holes (111) and engage releasably the holes (201') in the flexible strip (20'), thereby joining folded halves of the second side (11) of the pouch body (1). The pouch body (1) is now ready to receive the eyeglasses therein.

The fourth side (13) of the pouch body (1) may be provided with a row of evenly distributed and vertically oriented slits (131) which are disposed adjacent to a peripheral edge of the same, as shown in FIG. 1. Referring once more to FIG. 2, a drawstring (3) is inserted through the slits (131) and is operated so as to close the pouch body (1).

The first preferred embodiment is initially dismantled if it is to be used as a strap for retaining the pair of eyeglasses on the head of the user. The drawstring (3) is placed on an intermediate portion of the pouch body (1), and the pouch body (1) is folded so as to be wrapped around the drawstring (3). The two ends of the drawstring (3) are then attached to the bows of a pair of eyeglasses (not shown). The first preferred embodiment is now ready for use as a strap.

Figure 3:
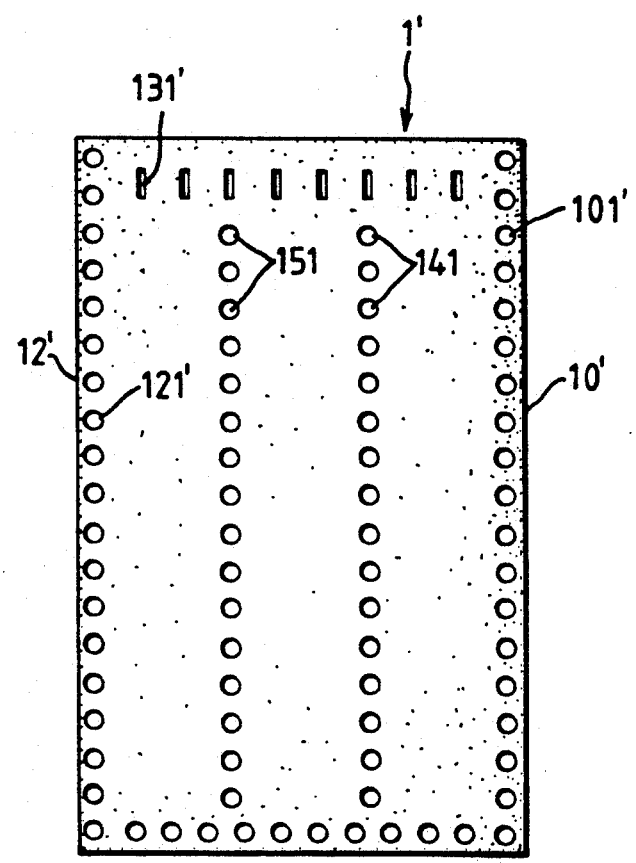
FIG. 3 is a front view of a pouch body of the second preferred embodiment of a multi-purpose eyeglasses pouch according to the present invention.

FIG. 3 illustrates the pouch body (1') of the second preferred embodiment of a multi-purpose eyeglasses pouch according to the present invention. The pouch body (1') is substantially similar to the pouch body (1) of the first preferred embodiment. The pouch body (1'), however, has an intermediate portion which is provided with two spaced rows of evenly distributed holes (141, 151) that are similar to the holes (101', 121') in the first and third sides (10', 12') of the pouch body (1').

Figure 4:
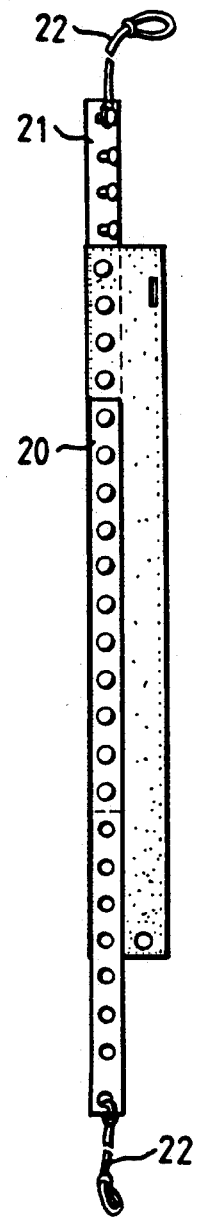
FIG. 4 is an illustration of the second preferred embodiment when formed as a strap.
Figure 5:
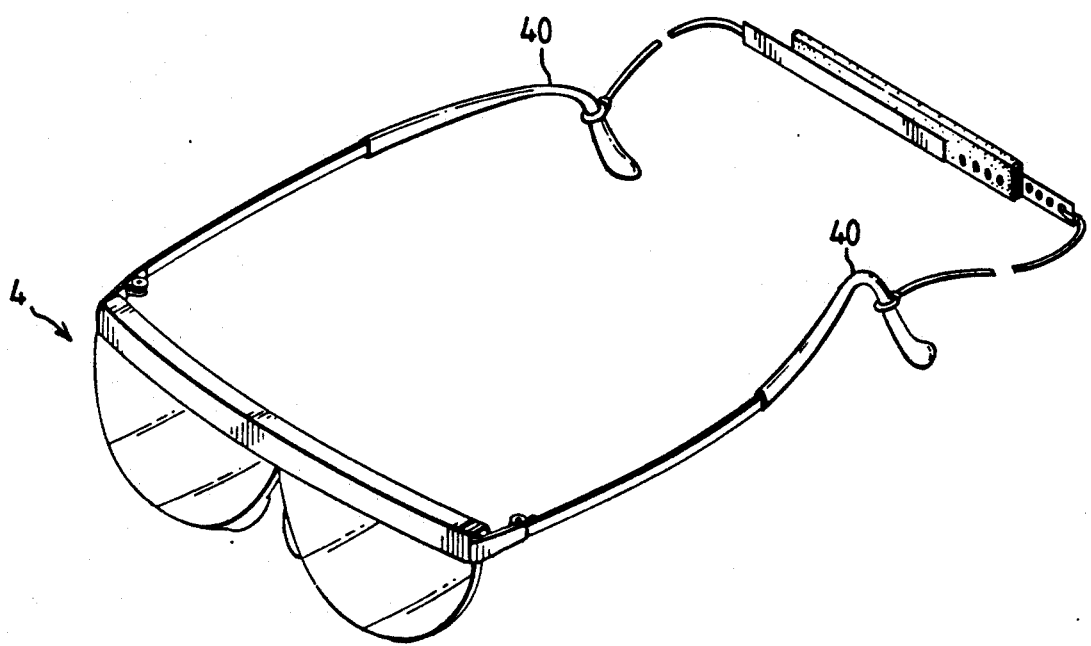
FIG. 5 is an illustration of the second preferred embodiment when attached to the bows of a pair of eyeglasses.

As with the first preferred embodiment, the second preferred embodiment is similarly dismantled if it is to be used as a strap for retaining a pair of eyeglasses on the head of the user. The pouch body (1') is folded twice so as to align the holes (101', 121', 141, 151), as shown in FIG. 4. The first flexible strips (20, 21) are then provided on opposite sides of the folded pouch body (1') so as to permit use of the second preferred embodiment as a strap. Note that not all of the projections (211) of the flexible strip (21) extend into the holes (101', 121', 141, 151) of the pouch body (1') and engage releasably the holes (201) in the flexible strip (20). The total length from a distal end of the flexible strip (20) to a distal end of the flexible strip (21) may therefore be varied in order to correspond with the size of the head of the user. An elastic cord (22) is secured on the distal end of each of the flexible strips (20, 21). The elastic cords (22) are then attached to the bows (40) of a pair of eyeglasses (4), as shown in FIG. 5. The second preferred embodiment is now ready for use as a strap.

It has thus been shown that the multi-purpose eyeglasses pouch of the present invention can be used to wipe the lenses of a pair of eyeglasses, to store the eyeglasses therein and as a strap to retain the eyeglasses on the head of the user. Since the pouch body is made of cloth, the eyeglasses pouch is relatively small and lightweight, thus making it convenient to carry.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A multi-purpose eyeglasses pouch, comprising:
  a pouch body formed from a rectangular piece of cloth and having a first side, a second side, a third side opposite to said first side and a fourth side opposite to said second side, each of said first, second and third sides being provided with a row of evenly distributed holes, said pouch body being folded so as to align said holes in said first side with said second side to overlap, said fourth side is provided with a row of slits;
  a drawstring inserted through said slits and operable so as to close said pouch body; and
  a fastening unit including a pair of first flexible strips and a pair of second flexible strips, one of said first flexible strips being formed with a row of holes which are aligned with said holes formed in said first and third sides, the other one of said first flexible strips being formed with a row of projections which extend into said holes in said first and third sides and which engage releasably said holes in said one of said first flexible strips so as to join said first and third sides, one of said second flexible strips being formed with a row of holes which are aligned with said overlapping holes in said second side, the other one of said second flexible strips being formed with a row of projections which extend into said overlapping holes and which engage releasably said holes in said one of said flexible strips so as to join folded halves of said second side.

2. A multi-purpose eyeglasses pouch, comprising:
  a pouch body formed from a rectangular piece of cloth and having a first side, a second side, a third side opposite to said first side and a fourth side opposite to said second side, each of said first, second and third sides being provided with a row of evenly distributed holes, said pouch body being folded so as to align said holes in said first side with said holes in said third side and so as to cause said holes in said second side to overlap, said pouch body having an intermediate portion which is provided with two spaced rows of evenly distributed holes that are similar to said holes in said first and third sides of said pouch body; and
  a fastening unit including a pair of first flexible strips and a pair of second flexible strips, one of said first flexible strips being formed with a row of holes which are aligned with said holes formed in said first and third sides, the other one of said first flexible strips being formed with a row of projections which extend into said holes in said first and third sides and which engage releasably said holes in said one of said first flexible strips so as to join said first and third sides, one of said second flexible strips being formed with a row of holes which are aligned with said overlapping holes in said second side, the other one of said second flexible strips being formed with a row of projections which extend into said overlapping holes and which engage releasably said holes in said one of said flexible strips so as to join folded halves of said second side.

* * * * *